Patented Dec. 28, 1937

2,103,639

UNITED STATES PATENT OFFICE 2,103,639

PRECIPITATION OR SETTING OF HYDROXY-CELLULOSE ETHERS FROM ALKALINE AQUEOUS SOLUTIONS

George A. Richter, Berlin, N. H., assignor to Brown Company, Berlin, N. H., a corporation of Maine No Drawing. Application February 9, 1934, Serial No. 710,562

5 Claims. (Cl. 18—54)

This invention relates to the precipitation or setting of hydroxy-cellulose ethers from alkaline aqueous solutions as in the form of films, filaments, and other end products. In speaking herein about the precipitation or setting of such ethers from solution, I mean that the solid ether as such is re-created from the solution. The preparation of the hydroxy-cellulose ethers and the use of alkaline aqueous solutions of such ethers for the purpose of forming such products as films and filaments is now known. An important advantage possessed by such ethers is that not only can they be precipitated from solution in the form of films, filaments, or the like through the action of acid solutions much in the same way as cellulose is regenerated from viscose or cellulose xanthate solutions but further that the precipitated ethers require no chemical after-treatments, whereas cellulose regenerated from viscose must be put through such chemical purifying treatments as de-sulphurization, bleaching, etc. Heretofore, the practice has been to use a sulphuric acid solution of sodium sulphate or other salt for the purpose of precipitating the hydroxy-cellulose ethers from solution as has been the case in regenerating cellulose from viscose.

I have found that it is decidedly advantageous in the case of hydroxy-cellulose ethers to use more particularly sulphur dioxide for the purpose of precipitating such ethers from alkaline aqueous solutions as in the form of films and filaments. Thus, whereas in the case of viscose sulphur dioxide cannot properly do the work of regenerating cellulose and tends to react with the sulphide groups present or generated in the viscose to precipitate an undesirable amount of sulphur, this does not happen in the case of the alkaline aqueous solutions of the hydroxy-cellulose ethers. On the contrary, the sulphur dioxide proceeds to precipitate the ethers from solution by reacting with and neutralizing the caustic soda that serves to keep the ethers in solution, thereby forming sodium sulphite as a reaction product. The sodium sulphite thus produced may be leached or washed out of the precipitated ether in the form of a sulphite solution which may be recovered and used to good advantage in the preparation of cooking liquors such as are used for the pulping of wood or other raw cellulose materials, for instance, so-called bisulphite cooking liquors.

While the sulphur dioxide may be used in aqueous solution for the purpose of the present invention, it possesses the additional advantage that it can be used in the form of a gas. Indeed, in many instances, it may be distinctly preferable to use the sulphur dioxide in gaseous form, as this avoids difficulties such as may arise from the tenderness inhering in the wet films or filaments of ether formed in aqueous precipitating solutions. When the sulphur dioxide is used in solution it may be dissolved in plain water or in aqueous solutions containing sodium sulphite, sodium sulphate, or other salts. Thus, the precipitating or setting medium may consist of a sulphurous acid solution or a solution of sodium bisulphite containing, if desired, more sulphur dioxide than is necessary to form the bisulphite. Aside from the value of the sulphur dioxide as a neutralizer for the alkali content of the ether solution, it functions as a decolorizing or bleaching agent to enhance the whiteness and brightness of the films, filaments, or other end products precipitated from the ether solutions. In this connection, it might be mentioned that the sulphur dioxide is preferably used in such amount as to effect not only a complete neutralization of the alkali content of the ether solution but to exercise some bleaching action.

I need not dwell long upon the particular way in which solutions of the hydroxy-cellulose ethers are prepared, as this does not constitute part of the present invention. As illustrative of the manner in which various hydroxy alkyl ethers of cellulose, such as those including the methyl, ethyl, propyl, and butyl grouping, are made and put into alkaline aqueous solution, I shall discuss the hydroxy ethyl ether of cellulose. This ether is prepared by causing cellulose and ethylene oxide vapor to react in the presence of a small amount of suitable catalyzer, such as pyridine. The resulting ether is then activated or peptized for solution by mixing with caustic soda solution of about 7% to 8% strength, freezing the mixture, and thawing it out. In this way, it is possible to dissolve about 7% to 8% of the hydroxy ethyl ether of cellulose in the caustic soda solution to form a syrup or solution of the proper fluidity and other characteristics for casting films, spinning filaments, or forming other ultimate products.

In making films, the ether syrup may be deposited as ordinarily as a coating of the desired thickness on the smooth metallic or glass surface constituting the periphery of the conventional rotary film-making drum. In accordance with the present invention, the coating while carried by the drum may pass under a current of sulphur dioxide gas which impinges thereagainst from a delivery nozzle and is absorbed thereby in amount to neutralize substantially completely its caustic soda content and thereby precipitate or set the ether as a film which can be progressively stripped from the drum, led through a bath of wash water, which extracts the sodium sulphite and/or sodium bisulphite from the film, then dried, and accumulated in a roll. The current of sulphur dioxide may be caused to sweep over a substantial arcuate area of coating in the direction of rotation of the drum and be sucked into an exhaust nozzle for recovery and reuse.

In making filaments, the ether syrup may in accordance with the present invention be spun through spinnerets into an enclosed atmosphere of sulphur dioxide gas which substantially completely precipitates or sets the ether from solution in filamentary form. The spinning of such filaments is thus done by what might be called a dry-spinning practice analogous to that followed in making cellulose acetate silk. The filaments progressively delivered from the regenerating atmosphere may be washed, dried, and reeled. As in ordinary practice, the filaments or films produced according to the present invention may be glycerinated or treated with other softening agents.

The sulphur dioxide gas used for the purpose of the present invention may be heated to a temperature as high as, say, 60° to 70° C. Inasmuch as the ether solution, unlike viscose, is quite stable and does not tend to set even when heated to a temperature as high as, say, 60° to 70° C., the ether solution itself may be heated to such temperature in order to promote the desired reaction between the sulphur dioxide and the caustic soda present in the solution. For the purpose of heating the sulphur dioxide gas, steam may be admixed therewith. Thus, the spinning of the ether solution into filaments may be done in an atmosphere of sulphur dioxide and steam, the steam not only functioning to increase the temperature of the sulphur dioxide, but to accelerate the reaction of the sulphur dioxide with the alkali content of the filaments and thereby to promote setting or precipitation of the filaments and also to inhibit undesirable evaporation of water from the filaments.

So far as I am aware, I am the first to apply the principle of using acid gaseous reagents for the purpose of precipitating or setting the hydroxy-cellulose ethers from alkaline aqueous solution. While, as already indicated, I prefer to use sulphur dioxide gas for this purpose, nevertheless, such acidic gases or vapors as sulphur trioxide, hydrochloric acid, chlorine, carbon dioxide, or the like, may be used alone or in admixture to gain at least some of the benefits of my invention.

I claim:—

1. In the precipitation of the hydroxy-cellulose ethers from alkaline aqueous solutions in the form of films, filaments, and the like, that step which comprises causing such precipitation through the reaction of sulphur dioxide admixed with steam on such solution, thereby developing substantially only completely water-soluble sulphite as the reaction product of the sulphur dioxide while the sulphur dioxide is exercising a bleaching action.

2. In the precipitation of the hydroxy-cellulose ethers in the form of films, filaments, and the like from alkaline aqueous solution containing caustic soda as the solubilizing agent for such ethers, those steps which comprise causing such precipitation from such solution through the reaction thereupon of sulphur dioxide as such in amount sufficient to neutralize completely the caustic soda content of such solution and to bleach the resulting precipitated ether body, thereby developing substantially only sodium sulphite as the reaction product of the sulphur dioxide while the sulphur dioxide in excess of that serving to neutralize the caustic soda is exercising a bleaching action on the precipitated ether body, and washing the precipitated ether body with water to extract therefrom said sodium sulphite and thus to produce a finished ether body substantially free from contaminative reaction product and coloring matter.

3. In the precipitation of the hydroxy-cellulose ethers in the form of films, filaments, and the like from alkaline aqueous solution containing caustic soda as the solubilizing agent for such ethers, those steps which comprise causing such precipitation from such solution through the reaction thereupon of sulphur dioxide gas in amount sufficient to neutralize completely the caustic soda content of such solution and to bleach the resulting precipitated ether body, thereby developing substantially only sodium sulphite as the reaction product of the sulphur dioxide while the suphur dioxide in excess of that serving to neutralize the caustic soda is exercising a bleaching action on the precipitated ether body, and washing the precipitated ether body with water to extract therefrom said sodium sulphite and thus to produce a finished ether body substantially free from contaminative reaction product and coloring matter.

4. In the precipitation of the hydroxy-cellulose ethers in the form of films, filaments, and the like from alkaline aqueous solution containing caustic soda as the solubilizing agent for such ethers, those steps which comprise causing such precipitation through the reaction on such solution of an aqueous medium containing dissolved therein sulphur dioxide as such in amount sufficient to neutralize completely the caustic soda solution content of such solution and to bleach the resulting precipitated ether body, thereby developing substantially only sodium sulphite as the reaction product of the sulphur dioxide while the sulphur dioxide in excess of that serving to neutralize the caustic soda is exercising a bleaching action on the precipitated ether body, and washing the precipitated ether body with water to extract therefrom said sodium sulphite and thus to produce a finished ether body substantially free from contaminative reaction product and coloring matter.

5. In the precipitation of the hydroxy-cellulose ethers in the form of films, filaments, and the like from alkaline aqueous solution containing caustic soda as the solubilizing agent for such ethers, those steps which comprise causing such precipitation through the reaction on such solution of sulphur dioxide gas heated to about 60° to 70° C. and in amount sufficient to neutralize completely the caustic soda content of such solution and to bleach the resulting precipitated ether body, thereby developing substantially only sodium sulphite as the reaction product of the sulphur dioxide while the sulphur dioxide in excess of that serving to neutralize the caustic soda is exercising a bleaching action on the precipitated body, and washing the precipitated ether body with water to extract therefrom said sodium sulphite and thus to produce a finished ether body substantially free from contaminative reaction product and coloring matter.

GEORGE A. RICHTER.